United States Patent
Sakamoto et al.

(10) Patent No.: US 8,694,185 B2
(45) Date of Patent: Apr. 8, 2014

(54) DISCHARGE CONTROL APPARATUS FOR ELECTRIC VEHICLE

(75) Inventors: Tomokazu Sakamoto, Saitama (JP); Tatsuo Hayashi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 450 days.

(21) Appl. No.: 13/170,727

(22) Filed: Jun. 28, 2011

(65) Prior Publication Data
US 2012/0004798 A1  Jan. 5, 2012

(30) Foreign Application Priority Data
Jun. 30, 2010   (JP) ................................. 2010-149784

(51) Int. Cl.
*B60L 11/00* (2006.01)
*G06F 17/00* (2006.01)

(52) U.S. Cl.
USPC ............. 701/22; 320/131; 320/132; 320/134; 340/636.13; 340/636.2; 324/537; 324/427

(58) Field of Classification Search
USPC ............ 701/22; 320/141–132, 119, 134, 120, 320/124, 135–136, 131; 324/427, 537; 702/61, 63; 340/636.13, 636.2, 636.15; 429/61
See application file for complete search history.

(56) References Cited

U.S. PATENT DOCUMENTS 5,650,712 A * 7/1997 Kawai et al. .................. 324/427
5,698,962 A * 12/1997 Sakai et al. .................... 324/431
6,160,380 A * 12/2000 Tsuji et al. .................... 320/132
6,563,318 B2 * 5/2003 Kawakami et al. ........... 324/426
6,832,171 B2 * 12/2004 Barsoukov et al. ............. 702/65
7,211,987 B2 * 5/2007 Aoki et al ..................... 320/134

(Continued)

FOREIGN PATENT DOCUMENTS

CN           101013822 B  *  4/2012
EP             1801947 B1  *  5/2013

(Continued)

OTHER PUBLICATIONS

A coupled OD electrochemical ageing & electro-thermal Li-ion modeling approach for HEV/PHEV; Prada, E. ; Di Domenico, D. ; Creff, Y. ; Bernard, J. ; Sauvant-Moynot, V.; Vehicle Power and Propulsion Conference (VPPC), 2011 IEEE; Digital Object Identifier: 10.1109/VPPC.2011.6043002; Publication Year: 2011 , pp. 1-8.*

(Continued)

*Primary Examiner* — Cuong H Nguyen
(74) *Attorney, Agent, or Firm* — Birch, Stewart, Kolasch & Birch, LLP (57) ABSTRACT

A discharge control apparatus in an electric motorcycle includes a main battery; a motor driven based upon electric power supplied from the main battery and a lighting device that is a load other than the motor for consuming electric power. A BMU determines a remaining capacity of the main battery. A control member performs a discharge control of the main battery for supplying electric power to the motor and the lighting device. The BMU and the control member allow the discharge of the main battery until the remaining capacity becomes a threshold value higher than zero. When the control member receives an instruction of checking a deterioration state of the main battery from an external checking device, the control member performs a discharge of the main battery until the remaining capacity reaches zero, and then, allows the main battery to be fully charged so as to determine a chargeable capacity.

20 Claims, 9 Drawing Sheets

(56) References Cited

U.S. PATENT DOCUMENTS

| | | | |
|---|---|---|---|
| 7,403,016 B2 * | 7/2008 | Furukawa et al. | 324/426 |
| 8,102,152 B2 * | 1/2012 | Ugaji et al. | 320/134 |
| 8,310,205 B1 * | 11/2012 | Hamburgen | 320/130 |
| 2013/0132011 A1 * | 5/2013 | Mano et al. | 702/63 |

FOREIGN PATENT DOCUMENTS

| | | | |
|---|---|---|---|
| EP | 2595236 A1 * | 7/2013 | |
| JP | 2009-254038 | 10/2009 | |
| JP | 2011138767 A * | 7/2011 | |
| WO | WO 2013038763 A1 * | 3/2013 | |

OTHER PUBLICATIONS

Detection of Utilizable Capacity Deterioration in Battery Systems; Roscher, M.A. ; Assfalg, J. ; Bohlen, O.S.; Vehicular Technology, IEEE Transactions on; vol. 60 , Issue: 1; Digital Object Identifier: 10.1109/TVT.2010.2090370; Publication Year: 2011 , pp. 98-103.*

Load characteristics of electric vehicles in charging and discharging states and impacts on distribution systems; Wang, Hui ; Song, Qi ; Zhang, Liyan ; Wen, Fushuan ; Huang, Jiansheng; Sustainable Power Generation and Supply (SUPERGEN 2012), International Conf. on; Dig. Obj. Id.: 10.1049/cp.2012.1837; Pub. Yr: 2012 , pp. 1-7.*

Adaptive voltage estimation for EV Li-ion cell based on artificial neural networks state-of-charge meter; Eddahech, A. ; Briat, O. ; Vinassa, J.M.; Industrial Electronics (ISIE), 2012 IEEE International Symposium on; Digital Object Identifier: 10.1109/ISIE.2012.6237281; Publication Year: 2012 , pp. 1318-1324.*

Battery State-of-Charge Estimator Using the MARS Technique; Álvarez Antón, J.C. ; Garcia Nieto, P.J. ; de Cos Juez, F.J. ; Sánchez Lasheras, F. ; Blanco Viejo, C. ; Roqueñí Gutiérrez, N.; Power Electronics, IEEE Transactions on; vol. 28 , Issue: 8; Dig. Obj. Id: 10.1109/TPEL.2012.2230026; Publication Year: 2013 , pp. 3798-3805.*

A new concept for bidirectional inductively coupled battery charging system based on ac-dc-ac converter for PHEV's and EV's using fuzzy logic approach Joy, T.P.E.R. ; Thirugnanam, K. ; Kumar, P.; Transportation Electrification Conference and Expo (ITEC), 2012 IEEE; Digital Object Identifier: 10.1109/ITEC.2012.6243432;Pub. Yr: 2012 , pp. 1-6.*

* cited by examiner

DISCHARGE CONTROL APPARATUS FOR ELECTRIC VEHICLE

CROSS-REFERENCE TO RELATED APPLICATIONS

The present application claims priority under 35 USC 119 to Japanese Patent Application No. 2010-149784 filed on Jun. 30, 2010 the entire contents of which are hereby incorporated by reference.

BACKGROUND OF THE INVENTION

1. Field of the Invention

The present invention relates to a discharge control apparatus in an electric vehicle for performing a discharge control of a battery mounted to the electric vehicle.

2. Description of Background Art

JP-A No. 2009-254038 sets forth a technique in which, in order to prevent deterioration in a battery in an electric vehicle, it is determined whether or not a voltage of the battery falls to a lower-limit check value, which is higher than a module-voltage lower-limit value. When the voltage falls to the lower-limit check value and a predetermined time has elapsed, a restriction is imposed on the discharge of the battery. With this, the over-discharge of the battery can be prevented.

In the JP-A No. 2009-254038, the over-discharge can be prevented, but the electric energy that the battery can store cannot correctly be determined. More specifically, the battery deteriorates when it is used, and the electric energy that the battery can store also decreases with the deterioration, so that the electric energy cannot correctly be determined.

SUMMARY AND OBJECTS OF THE INVENTION

The present invention is accomplished in view of the conventional problem, and aims to provide a discharge control apparatus in an electric vehicle that enhances a precise calculation of the electric energy that a battery can store.

In order to attain the foregoing object, according to an embodiment of the present invention, a discharge control apparatus (100) in an electric vehicle (10) includes a battery (18); a motor (16) driven based upon electric power supplied from the battery (18) and a discharge load (58, 76, 80, 82, 118) that is a load other than the motor (16) and that consumes electric power from the battery (18). A battery capacity determining means (104) is provided that determines a remaining capacity of the battery (18). A control means (104, 114) performs a discharge control of the battery (18) for supplying electric power to the motor (16) and the discharge load (58, 76, 80, 82, 118), wherein the control means (104, 114) allows the discharge of the battery (18) until the remaining capacity becomes a threshold value higher than zero in a normal mode, and when it receives an instruction of checking a deterioration state of the battery (18) from an external checking device (150), it changes the normal mode to a service mode in which it allows the discharge of the battery (18) until the remaining capacity becomes zero, and then, allows the battery to be fully charged so as to determine a chargeable capacity.

According to an embodiment of the present invention, in the discharge control apparatus (100) in the electric vehicle (10) the discharge load (58, 76, 80, 82, 118) is a lighting device represented by a taillight (58), headlight (76), etc.

According to an embodiment of the present invention, the control means (104, 114) supplies electric power to the motor (16) so as to prevent the motor (16) from rotating, when discharging the battery (18) until the remaining capacity becomes zero.

According to an embodiment of the present invention, the control means (104, 114) includes a control program for executing the normal mode and a control program for executing the service mode, wherein the control means changes the control program to be executed according to the instruction from the checking device (150) for checking the deterioration state.

According to an embodiment of the present invention, the remaining capacity, a cell voltage, and a cell temperature are displayed on the checking device (150).

According to an embodiment of the present invention, the discharge of the battery is allowed until the remaining capacity of the battery becomes a threshold value higher than zero, and when the control means receives an instruction of checking a deterioration state of the battery from an external checking device, it allows the discharge of the battery until the remaining capacity becomes zero. Therefore, the deterioration of the battery due to over-discharge can be prevented, and the calculation precision of the electric power (chargeable capacity) that the battery can store can be enhanced, whereby an operation of the electric vehicle is possible wherein a user assumes a distance capable of being traveled.

According to an embodiment of the present invention, since the discharge load is a lighting device represented by a taillight, headlight, etc., the battery is discharged by utilizing the lighting device mounted to the electric vehicle. Therefore, the battery can efficiently be discharged without preparing a specific component.

According to an embodiment of the present invention, since the electric power is supplied to the motor so as to prevent the motor from rotating when the battery is discharged until the remaining capacity of the battery becomes zero, the battery can promptly be discharged without starting the electric vehicle.

According to an embodiment of the present invention, since two control programs are incorporated beforehand in the control means, cost can be reduced.

According to an embodiment of the present invention, since the remaining capacity, a cell voltage, and a cell temperature are displayed on the checking device, the time for exchanging the battery can correctly be determined.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

A discharge control method of an electric vehicle according to the present invention will be described below in detail with reference to a preferable embodiment involved with a discharge control apparatus of an electric vehicle embodying this method and with reference to the attached drawings.

Figure 1:
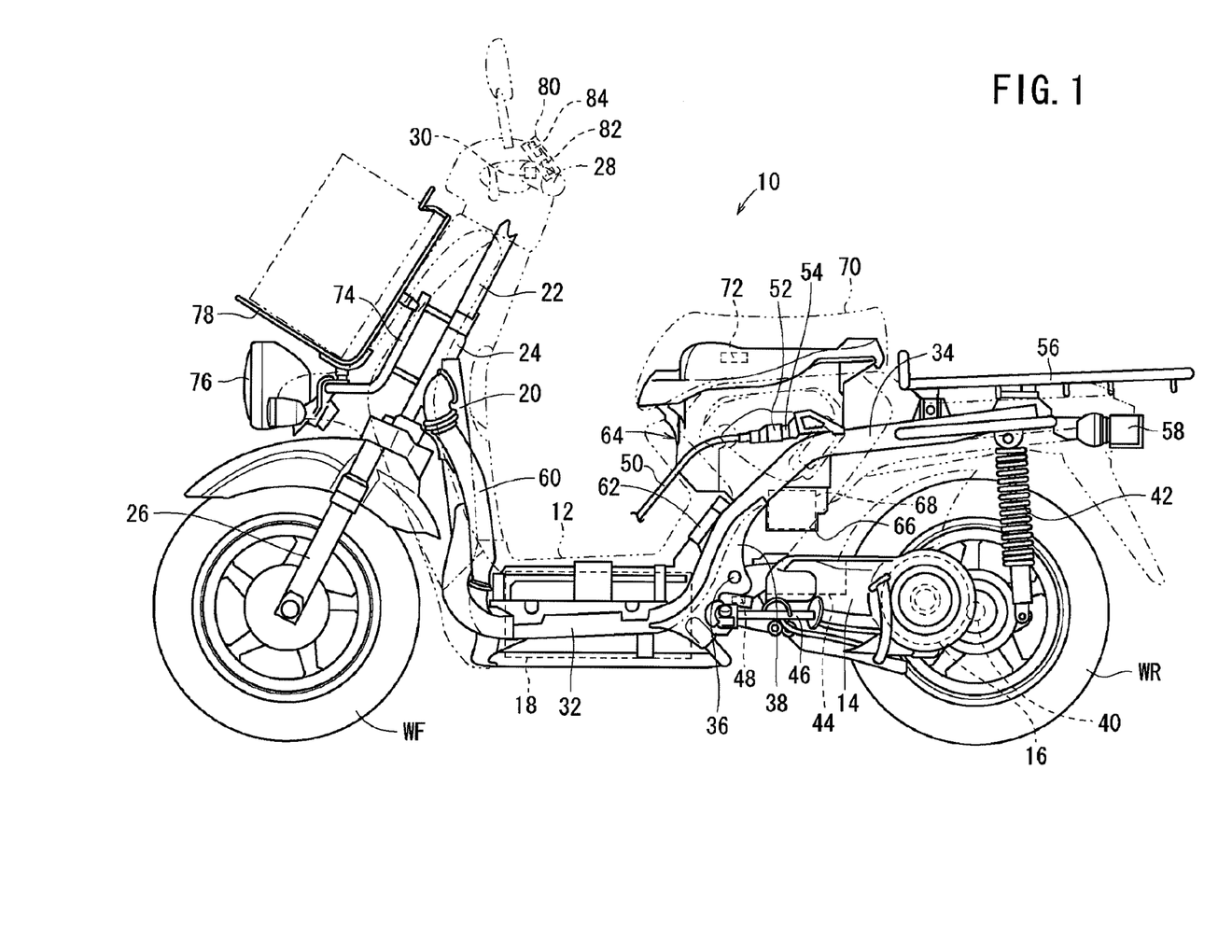
FIG. 1 is a left side view of an electric motorcycle having mounted thereto an electric power supplying apparatus (discharge control apparatus)

FIG. 1 is a left side view of an electric motorcycle having mounted thereto an electric power supplying apparatus (discharge control apparatus). An electric motorcycle (electric vehicle) 10 is a scooter-type motorcycle having a step floor 12. A rear wheel WR is driven with a rotation drive force from a motor 16 mounted to a swing arm 14. A high-voltage (e.g., 72 V) main battery 18 supplying electric power to the motor 16 includes plural modules to which plural battery cells are connected in series.

A head pipe 24 journaling the steering stem 22 so as to be rotatable is coupled to an upper end of a main frame 20. A pair of left and right front forks 26 that journals a front wheel WF so as to be rotatable is attached to the steering stem 22. The front wheel WF is steerable by a steering handlebar 28 that is mounted to the upper portion of the steering stem 22 and that has an accelerator grip. A throttle sensor 30 that detects a turning angle of the accelerator grip, i.e., an accelerator opening, is provided to the steering handlebar 28.

A pair of left and right side frames 32 extending rearward of a vehicle body is coupled to the main frame 20, and a rear frame 34 extending upward and rearward of the body is coupled to the pair of left and right side frames 32. A pivot frame 38 having formed thereon a swing arm pivot 36 is mounted at the rear part of the side frame 32. A front end of a cantilever swing arm 14 that supports the rear wheel WR only with a left arm in the body width direction is swingably journaled to the swing arm pivot 36. The rear wheel WR is rotatably journaled to the rear end of the swing arm 14 by an axle 40, and the rear end of the swing arm 14 is hung down from a rear frame 34 by a rear suspension 42.

A PDU (power drive unit) 44 that converts DC current supplied from the main battery 18 into AC current and feeds the same to the motor 16 is provided to the swing arm 14. A side stand 46 is provided to the pivot frame 38, and the side stand 46 has a side stand switch 48 that outputs a detection signal when the side stand 46 is stored in a predetermined position.

A charging socket 54 to which a charging plug 52 of a charging cable 50 extending from a battery charger (not illustrated) for charging the main battery 18 can be connected is provided on the rear frame 34. A rear carrier 56 and a taillight 58 are also provided to the rear frame 34.

An air inlet pipe 60 is coupled to the front part of the main battery 18, and an intake fan 62 is provided at the rear part of the main battery 18. Air is introduced into the main battery 18 from the air inlet pipe 60 by the intake fan 60, and exhausted to the rear of the body. With this structure, heat generated by the main battery 18 can be cooled by external air.

A cargo room 64 is formed between the pair of left and right rear frames 34, and a cargo-room bottom part 66 projecting downward from the cargo room 64 has stored therein a low-voltage (e.g., 12 V) sub-battery 68 that is charged by the main battery 18 or the battery charger. A rider's seat 70 serving also as a cover of the cargo room 64 is provided on the cargo room 64, wherein a seat switch 72 that operates and outputs a seating signal when a rider seats is mounted to the rider's seat 70.

A bracket 74 is coupled to the front part of the head pipe 24, wherein a headlight 76 is mounted to the front end of the bracket 74, and a front carrier 78 supported by the bracket 74 is mounted above the headlight 76. A meter unit 80 that display a vehicle speed or the like is mounted in the vicinity of the steering handlebar 28, and the meter unit 80 includes an indicator 82 promoting a deterioration check of the main battery 18 and a display unit 84 displaying a remaining capacity of the battery.

Figure 2:
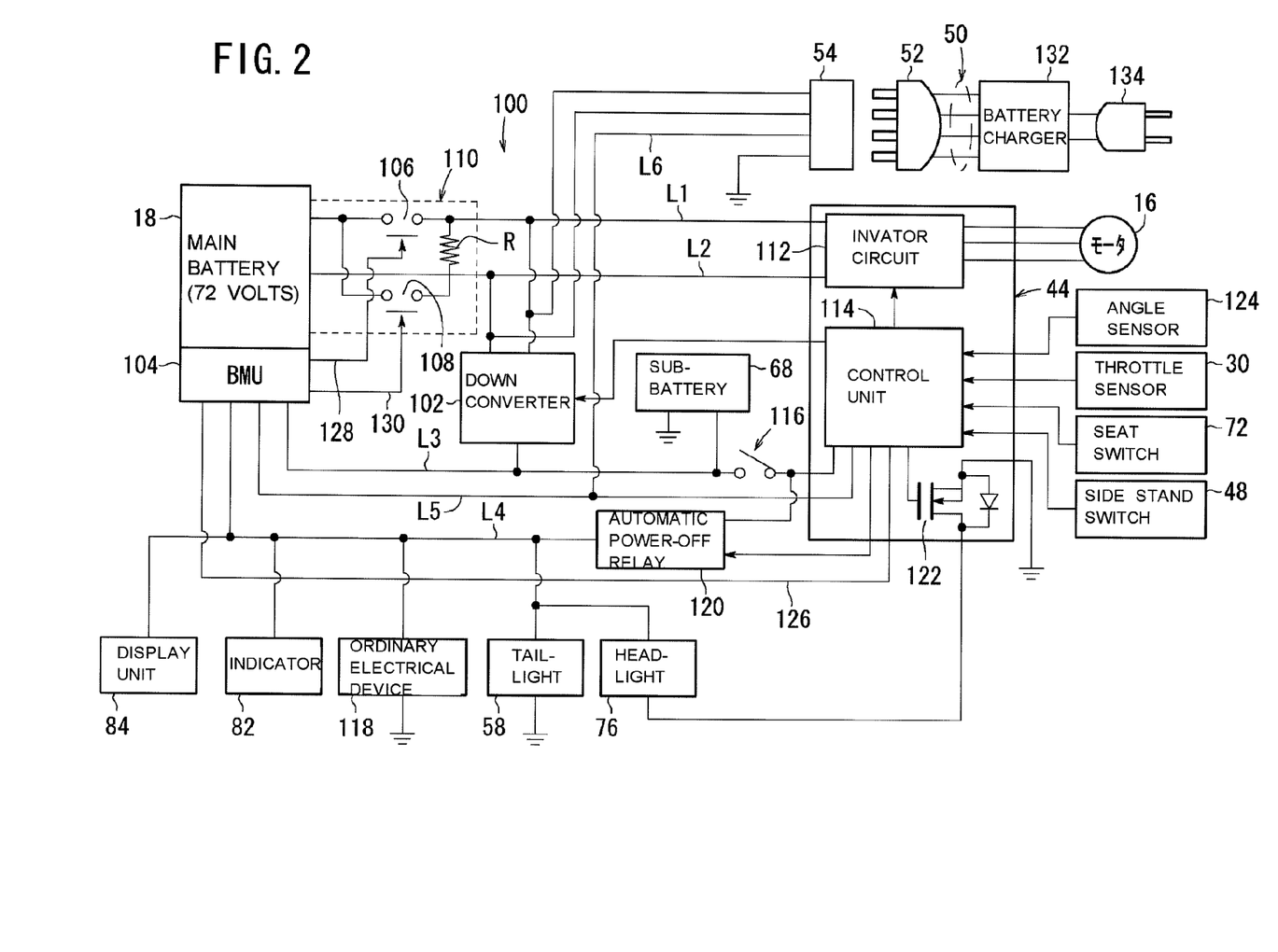
FIG. 2 is a block diagram illustrating a configuration of a system of the electric power supplying apparatus.

FIG. 2 is a block diagram illustrating a configuration of a system of the power supplying apparatus. The electric power supplying apparatus 100 includes, in addition to the main battery 18, the sub-battery 68, and the PDU 44, a DC-CD down converter (hereinafter referred to as a down converter) 102, and a BMU (battery management unit) 104 that is mounted in the main battery 18 and is composed of a microcomputer.

The main battery 18 includes three sets of battery modules of 24-volt lithium ion, for example, and it forms a battery pack together with the BMU (battery capacity determining means, control means) 104 that can be constituted by LSI or ASIC. The three sets of battery modules are connected in series. The main battery 18 is electrically connected to an input side of an inverter circuit 112 by power lines L1 and L2 via a relay device 110 including a contactor 106 and a precharge contactor 108, which are connected in parallel. A three-phase AC output side of the inverter circuit 112 is connected to the motor 16 by a three-phase AC line.

The power lines L1 and L2 are connected to an input side of the down converter 102, and also connected to the charging socket 54. The down converter 102 converts the high-voltage input (e.g., the voltage of the main battery 18 that is 72 volts) into a low voltage (e.g., the charging voltage of the sub-battery 68 of 12 V) and outputs the resultant. The sub-battery 68 is a power supply of the control unit 114 (control means), and is charged with 14.3 V, for example.

The output of the down converter 102 is connected to a normal system line L3, and the normal system line L3 is connected to the sub-battery 68, the BMU 104, and the control unit 114. A main switch 116 is provided on the normal system line L3, and the control unit 114 is connected to the sub-battery 68 via the main switch 116.

The sub-battery 68 is connected to a main switch system line LA via the main switch 116, and the main switch system line L4 is connected a lighting device represented by the taillight 58 and the headlight 76, the indicator 82, the display unit 84, and an ordinary electrical device 118. An automatic power-off relay 120 is provided to the main switch system line L4. The indicator 82, the display unit 84, the lighting device, and the ordinary electrical device 118 are collectively referred to as a discharge load. The control unit 114 is an information processing device (computer) having unillustrated memory (storage unit).

The headlight 76 is grounded via a switching element 122 mounted in the control unit 114. The control unit 114 has connected thereto an angle sensor 124 that detects the rotation angle of the motor 16, the throttle sensor 30, the seat switch 72, and the side stand switch 48.

A CAN communication line 126 is provided between the BMU 104 and the control unit 114. Signal lines 128 and 130 are provided between the BMU 104 and the contactor 106 and the precharge contactor 108 of the relay device 110, respectively, wherein the BMU 104 outputs an on/off instruction to the contactor 106 and the precharge contactor 108 through the signal lines 128 and 130.

The battery charger 132 has the charging plug 52 connected to the charging socket 54, and a power plug 134 connected to a commercial AC power supply. The battery charger 132 can generate an auxiliary power-supply voltage (e.g., 12 V), and a line L6 for the auxiliary power supply is connected to a control system line L5 that controls between the BMU 104 and the control unit 114.

The main battery 18 has provided thereto a temperature sensor for detecting the temperature of the battery cell, a voltage sensor for detecting the voltage of the battery cell or the battery module of the main battery 18, or the voltage of the whole main battery 18, and a current sensor for detecting electric current flowing through the main battery 18. The BMU 104 determines the remaining capacity SOC (state of charge) of the main battery 18 based upon the temperature data (the temperature data of the main battery 18) detected by the temperature sensor, the voltage data (voltage data of the main battery 18) detected by the voltage sensor, and the current data (current data of the main battery 18) detected by the current sensor. The BMU 104 periodically determines the remaining capacity SOC of the main battery 18. The determination of the remaining capacity SOC is well known, so that the description will be skipped. The BMU 104 transmits the determined remaining capacity SOC of the main battery 18, and the temperature data, the voltage data, and the current data of the main battery 18 to the control unit 114. The BMU 104 calculates electric energy charged on the main battery 18 by using the amount of the electric current flowing through the main battery 18 upon charging the main battery 18.

The main battery 18 deteriorates depending upon a number of charging times, a number of discharging times, a number of over-discharge times, a number of over-charge times, and the temperature of the main battery 18. More specifically, the electric energy (chargeable capacity) that the main battery 18 can store reduces with the deterioration of the main battery 18, and varies according to the temperature of the main battery 18. The chargeable capacity means electric energy that can be charged to the main battery 18 before the remaining capacity SOC of the current main battery 18 becomes 100% from 0%.

Accordingly, even if the main battery 18 is fully charged, the distance and time that the electric motorcycle 10 can travel varies depending upon the degree of deterioration of the main battery 18 and the temperature of the main battery 18. When the main battery 18 is fully charged regardless of the degree of deterioration and the temperature of the main battery 18, the remaining capacity SOC of the main battery 18 to be determined becomes 100%. Therefore, attention should be paid to the fact that, even if the remaining capacity SOC is the same, the chargeable capacity of the main battery 18 is different depending upon the deterioration state.

Figure 3:
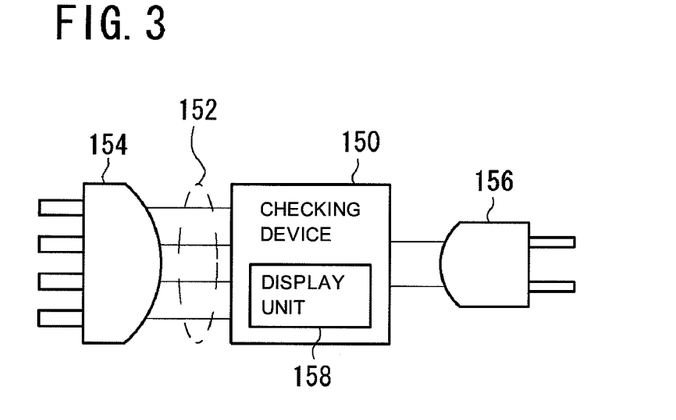
FIG. 3 is a schematic outline view of a checking device.

A checking plug 154 of the cable 152 extending from the checking device 150 illustrated in FIG. 3 can be connected to the charging socket 54 of the electric power supplying apparatus 100, in addition to the battery charger 132. The checking device 150 has the power plug 154 connected to the commercial AC power supply, and a display unit 158 for displaying the state of the main battery 18. The CAN communication line is provided to the cable 152. The checking device 150 is installed in a service station or a dealer selling the electric motorcycle 10. In the present embodiment, a charging connector is used for connection between the checking device 150 and the electric motorcycle 10, but a dedicated connector may be used instead of the charging connector. The communication between the checking device 150 and the electric motorcycle 10 is not limited to the CAN communication, but a dedicated communication protocol may be used.

Figure 4:
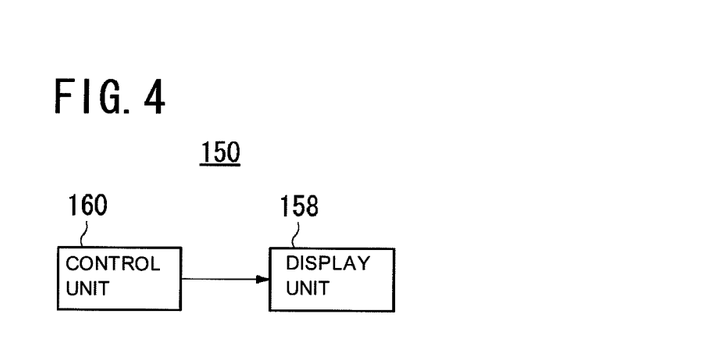
FIG. 4 is a diagram illustrating an electrical configuration of the checking device.

FIG. 4 is a diagram illustrating an electrical configuration of the checking device. The checking device 150 has a control unit 160 in addition to the display unit 158. The electric power supplying apparatus 100 is provided with an unillustrated CAN communication line connecting the control unit 114 and the charging socket 54, wherein the CAN communication line connecting the control unit 114 and the charging socket 54 and the CAN communication line provided to the cable 152 are connected by connecting the checking plug 154 of the checking device 150 to the charging socket 54. With this, the control unit 160 and the control unit 114 can make a CAN communication. An unillustrated mechanical or electrical connection detecting sensor is provided to the checking plug 154, wherein the connection detecting sensor outputs a connection signal to the control unit 160, when the checking plug 154 is connected to the charging socket 54. When the checking plug 154 is connected to the charging socket 54, the control unit 160 outputs an instruction of checking the deterioration state of the main battery 18 to the control unit 114 via the CAN communication. Examples of usable connection detecting sensor include a voltage sensor, a microswitch, an optical sensor, etc.

Next, an operation of the control unit of the PDU will be described with reference to the flowchart in FIG. 5. The control unit 114 of the PDU 44 has a control program executing a normal mode and a control program executing a service mode.

When the main switch 116 is turned on, the control unit 114 of the PDU 44 determines whether the instruction of checking the deterioration state of the main battery 18 is transmitted from the checking device 150 or not (step S1). When the main switch 116 is turned on, the voltage of the sub-battery 68 is applied to the main switch system line L4, whereby the electric power from the sub-battery 68 is fed to the automatic power-off (save) relay 120 via the main switch 116, and then, to the ordinary electrical device 118, the indicator 82, the display unit 84, the taillight 58, the headlight 76, and the BMU 104. The BMU 104 temporarily turns on the precharge contactor 108, and then, turns off the same. Thereafter, the BMU 104 turns on the contactor 106. The control unit 114 operates the down converter 102.

When the control unit 114 determines in step S1 that the instruction of checking the deterioration state of the main battery 18 is not transmitted from the checking device 150, it starts the control program for the normal mode to set the mode to the normal mode (step S2). When the control unit 114 sets the normal mode, it allows the discharge of the main battery 18 until the remaining capacity SOC of the main battery 18 periodically transmitted from the BMU 104 becomes a threshold value (e.g., 20%) higher than 0%. More specifically, the control unit 114 allows the supply of the main battery 18 to the motor 16 and the discharge load until the remaining capacity SOC of the main battery 18 becomes the threshold value. On the other hand, when the remaining capacity SOC of the main battery 18 becomes less than the threshold value, the discharge of the main battery 18 is inhibited. More specifically, the control unit 114 transmits a contactor control signal to the BMU 104 to turn off the contactor 106, and stops the PWM control of the inverter circuit 112. Only the PWM control of the inverter circuit 112 may be stopped without turning off the contactor 106. The control unit 114 also ends the drive of the down converter 102, and turns off the automatic power-off relay 120 after a lapse of predetermined time (e.g., after 10 minutes). With this, the supply of electric power to the motor 16 by the main battery 18 and the supply of the electric power to the discharge load from the main battery 18 are inhibited, whereby the discharge of the main battery 18 is inhibited. As described above, when the remaining capacity SOC of the main battery 18 becomes lower than the threshold value in the normal mode, the main battery 18 is no longer discharged, resulting in that the electric energy obtained by subtracting the threshold value from the electric energy stored in the main battery 18 is used in the normal mode. In the present embodiment, the electric energy obtained by subtracting the threshold value from the electric energy stored in the main battery 18 is referred to as a battery remaining amount. The electric energy obtained by subtracting the threshold value from the remaining capacity SOC (100%) of the main battery 18 is referred to as a usable electric energy. More specifically, the usable electric energy is a discharging capability of the main battery 18 regardless of the charged state of the main battery 18, i.e., the maximum electric energy that can be discharged, if it is charged.

When the opening operation of the throttle sensor 30 is executed in the normal mode, the control unit 114 performs the PWM control of the inverter circuit 112 to supply electric power to the motor 16, on the assumption that the seat switch 72 and the side stand switch 48 are turned on, i.e., that a rider seats on the rider's seat 70 and the side stand 46 is lifted up to a storing position.

A changeover timing of the switching element constituting the inverter circuit 112 is determined according to a rotation angle of the motor 16 by the angle sensor 124. The control unit 114 can calculate the vehicle speed by using the rotation angle detected by the angle sensor 124. Therefore, the angle sensor 124 also functions as a vehicle speed detecting sensor driven by the motor 16. A duty ratio in the PWM control is made according to the opening detected by the throttle sensor 30.

When the detected opening of the throttle sensor 30 is smaller than a predetermined value, or when at least either one of the seat switch 72 and the side stand switch 48 is turned off, the control unit 114 makes the duty ratio instructed to the inverter circuit 112 zero so as to stop the drive of the motor 16. The inhibitor control described above may be carried out only upon the start, and even if the seating is not detected by the seat switch 72, the inhibitor control may not be carried out during the travel of the electric motorcycle 10.

Figure 5:
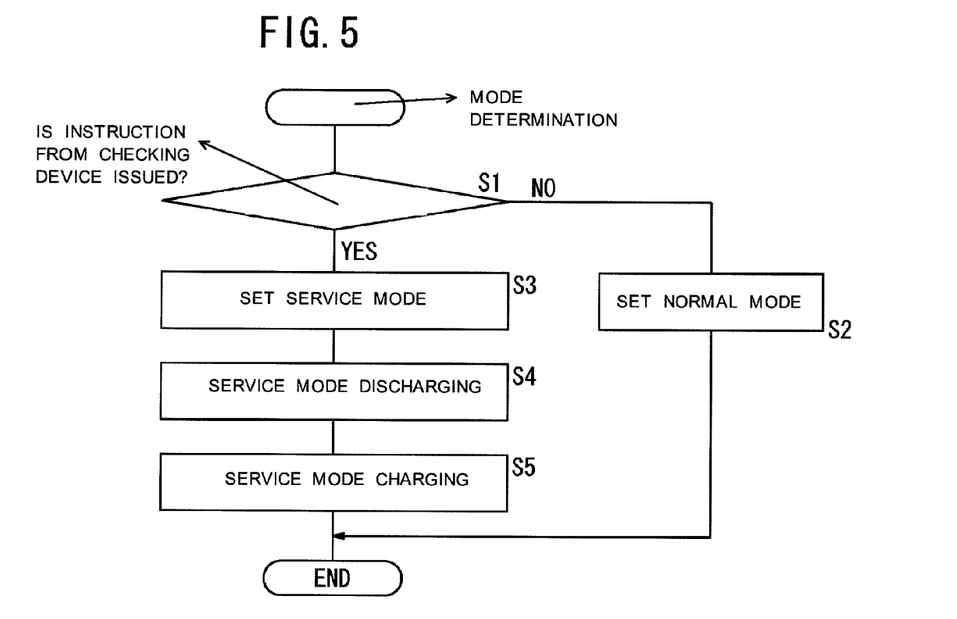
FIG. 5 is a flowchart illustrating an operation of a control unit of a PDU.

As illustrated in the flowchart in FIG. 5, when the control unit 114 determines in step S1 that the instruction of checking the deterioration state of the main battery 18 is transmitted from the checking device 150, it starts the control program for the service mode to set the mode to the service mode (step S3). As described above, the checking device 150 is put in a service station, and when a rider desires to check the deterioration state of the main battery 18, he/she carries the electric motorcycle 10 to the service station. In the service station, he/she temporarily turns off the main switch 116 of the electric vehicle 10. Then, when an operator in the service station connects the checking plug 154 to the charging socket 54, and turns on the main switch 116, the control unit 160 of the checking device 150 outputs an instruction signal for checking the deterioration state of the main battery 18 to the control unit 114 of the electric power supplying apparatus 100.

Then, the control unit 114 executes a service mode discharging control for discharging the main battery 18 according to the control program for the service mode (step S4), and after the discharge of the main battery 18, executes a service mode charging control for fully charging the main battery 18 (step S5). In this case, the power plug 156 of the checking device 150 is connected to an unillustrated AC 100V outlet that is the commercial AC power supply.

The control unit 114 stores the number of charging times or the traveling distance of the electric motorcycle 10. When the traveling distance exceeds a predetermined distance after the previous service discharging control in case where the main battery 18 is charged predetermined number of times after the previous service discharging control, the control unit 114 illuminates or flickers the indictor 82 so as to promote the execution of the deterioration check of the main battery 18. It is because it is considered that, when the main battery 18 is charged a predetermined number of times, or when the electric motorcycle 10 travels a predetermined distance, the main battery 18 is further deteriorated than in the previous service discharging control.

Figure 6:
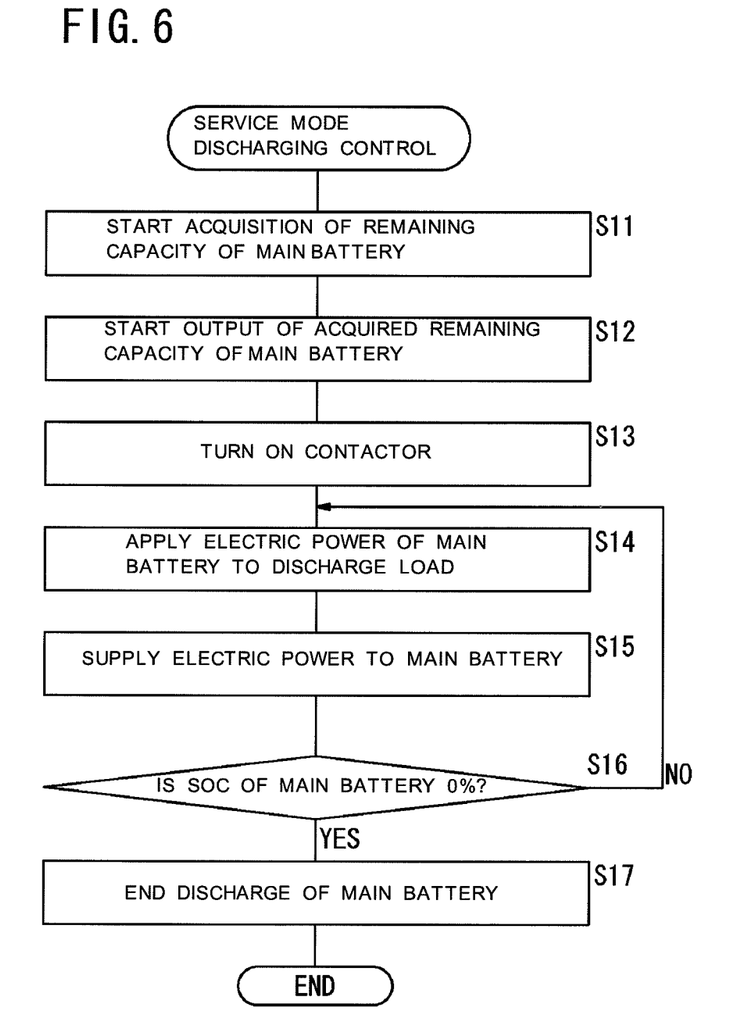
FIG. 6 is a flowchart illustrating an operation of a service mode discharging control.

The operation of the service mode discharging control will next be described with reference to the flowchart in FIG. 6. When the mode is set to the service mode, the control unit 114 of the PDU 44 starts to acquire the remaining capacity SOC of the main battery 18, the voltage data of the main battery 18, the current data of the main battery 18, and the temperature of the main battery 18 from the BMU 104 with the CAN communication (step S11).

Then, the control unit 114 starts to output the remaining capacity SOC of the main battery 18, the voltage data of the main battery 18, the current data of the main battery 18, and the temperature of the main battery 18, those of which are acquired through the CAN communication, to the checking device 150 (step S12). The control unit 160 of the checking device 150 displays the transmitted remaining capacity SOC of the main battery 18, the voltage data (cell voltage, module voltage, or voltage of the whole main battery 18) of the main battery 18, the current data of the main battery 18, and the temperature of the main battery 18 on the display unit 158. Thus, the rider or operator can find the state of the main battery 18, so that he/she can correctly determine the time for replacement of the main battery 18.

Then, the control unit 114 turns on the contactor 106 and the precharge contactor 108 (step S13). More specifically, the control unit 114 transmits the contactor control signal to the BMU 104 with the CAN communication, wherein the BMU 104 temporarily turns on the precharge contactor 108, and then, turns off the same, and thereafter, turns on the contactor 106, in response to the transmitted contactor control signal. When the contactor 106 has already been turned on, the control unit 114 does not perform the operation in step S13.

Next, the control unit 114 inputs the start signal to the down converter 102 to start the down converter 102, and turns on the automatic power-off relay 120 to apply the voltage, which is dropped by the down converter 102, to the discharge load (step S14). Thus, the electric power of the main battery 18 can be discharged by the discharge load. When the taillight 58 and the headlight 76, which have relatively great power consumption, are turned on, the electric power of the main battery 18 can efficiently be discharged. When the down converter 102 has already been started, and the voltage dropped by the down converter 102 has already been applied to the discharge load, the control unit 114 does not perform the operation in step S14.

Subsequently, the control unit 114 PWM-controls the inverter circuit 112 so as to supply the electric power of the main battery 18 to the motor 16 (step S15). Thus, the electric power of the main battery 18 can be discharged. In this case, when the motor 16 rotates, the tire of the electric motorcycle 10 rotates to start the electric motorcycle 10. Therefore, the control unit 114 supplies the electric power to the motor 16 so as to prevent the motor 16 from rotating. For example, when the motor 16 is operated in open-phase (when electric current to any one of three phases of UVW is cut), the electric power of the main battery 18 can be consumed without rotating the motor. When the service station has an apparatus that prevents the electric motorcycle 10 from starting even if the tire rotates, the motor 16 may be rotated.

Then, the control unit 114 determines whether the remaining capacity SOC of the current main battery 18 is 0% or not (step S16). It is determined in step S16 that the remaining capacity SOC of the main battery 18 is not 0%, the control unit 114 returns to step S14 to repeat the above-mentioned operation. On the other hand, it is determined in step S16 that the remaining capacity SOC of the main battery 18 become 0%, the control unit 114 ends the discharge of the main battery 18 (step S17). More specifically, the control unit 114 transmits the contactor control signal to the BMU 104 to turn off the contactor 106 as well as end the PWM control of the inverter circuit 112. The control unit 114 also ends the drive of the down converter 102, and turns off the automatic power-off relay 120. The rider or the operator turns off the main switch 116 to perform next the charging operation of the main battery 18, after the service discharging control is completed.

When an environmental temperature is less than 10° C., an error might be caused in the determination of the remaining capacity SOC of the main battery 18. Therefore, it is preferable that the environmental temperature during the service mode discharging control is 10° C. or more.

Figure 7:
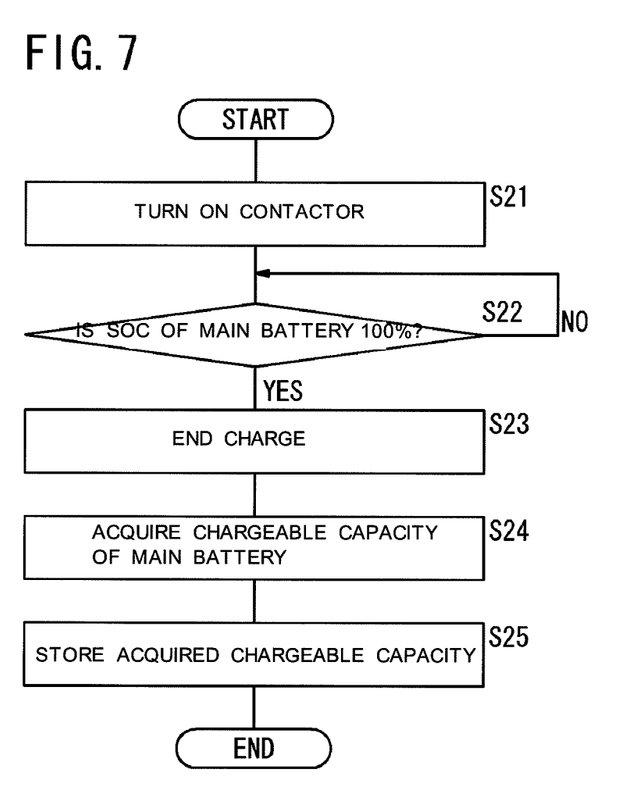
FIG. 7 is a flowchart illustrating a charging operation of a main battery.

The operation of the service mode charging control will be described with reference to the flowchart in FIG. 7. When the main battery 18 is discharged in the service mode, the rider or the operator of the electric motorcycle 10 removes the checking plug 154 of the checking device 150 from the charging socket 54, and connects the charging plug 52 of the battery charger 132 to the charging socket 54. In this case, the power plug 134 of the battery charger 132 is connected to the unillustrated AC 100V/200V outlet that is the commercial AC power supply.

When the charging plug 52 is connected to the charging socket 54, auxiliary power-supply voltage is applied to the control system line L5 from the battery charger 132 via the line L6 for the auxiliary power supply. The auxiliary power-supply voltage is applied to the control unit 114 and the BMU 104 through the control system line L5. When the auxiliary power-supply voltage is applied, the control unit 114 turns on the contactor 106 and the precharge contactor 108 (step S21). More specifically, the control unit 114 transmits the contactor control signal to the BMU 104 via the CAN communication (it may be a dedicated communication protocol). The BMU 104 temporarily turns on the precharge contactor 108, and then, turns off the same, and thereafter, turns on the contactor 106, in response to the transmitted contactor control signal. With this, the electric current is supplied from the battery charger 132 through the power lines L1 and L2, whereby the main battery 18 is charged. In this case, the control unit 114 may input the start signal to the down converter 102 to start the down converter 102 so as to apply the dropped voltage to the normal system line L3. When the dropped voltage is applied to the normal system line L3, the sub-battery 68 is charged. The BMU 104 starts the determination of the remaining capacity SOC of the main battery 18, when it is started.

Next, the control unit 114 determines that the remaining capacity SOC of the main battery 18 determined by the BMU 104 is 100% or not (step S22). When the control unit 114 determines in step S22 that the remaining capacity SOC of the main battery 18 determined by the BMU 104 is not 100%, it stays on step S22 until the remaining capacity SOC reaches 100%. When the control unit 114 determines that the remaining capacity SOC of the main battery 18 determined by the BMU 104 is 100%, it ends the charging (step S23). More specifically, the control unit 114 transmits the contact control signal to the BMU 104 so as to turn off the contactor 106. When the down converter 102 is started, the control unit 114 ends the drive of the down converter 102.

Then, the BMU 104 calculates (determines) the charged electric energy by using the amount of the electric current flowing through the main battery 18 from 0% to 100% of the remaining capacity SOC, and the control unit 114 acquires the electric energy calculated by the BMU 104 (step S24). This electric energy is the chargeable capacity of the current main battery 18.

Next, the control unit 114 stores the acquired chargeable capacity into the storage unit in the control unit 114 (step S25). The storage unit also stores the chargeable capacity of the initial (at the time of shipment) main battery 18. The control unit 114 may compare the chargeable capacity of the initial main battery 18 and the stored chargeable capacity of the main battery 18 so as to determine the deterioration state of the main battery 18.

When an environmental temperature is less than 10° C., an error might be caused in the determination of the remaining capacity SOC of the main battery 18. Therefore, it is preferable that the environmental temperature during the charging operation of the main battery 18 is 10° C. or more.

As described above, in the normal mode (when the electric power supplying apparatus 100 and the checking device 150 are not connected, i.e., when the electric motorcycle 10 is used), the discharge is allowed until the remaining capacity SOC of the main battery 18 becomes the threshold value higher than 0%, and when the remaining capacity SOC becomes lower than the threshold value, the discharge is inhibited. Therefore, the over-discharge of the main battery 18 can be prevented, whereby the deterioration of the main battery 18 can be suppressed.

Figure 8:
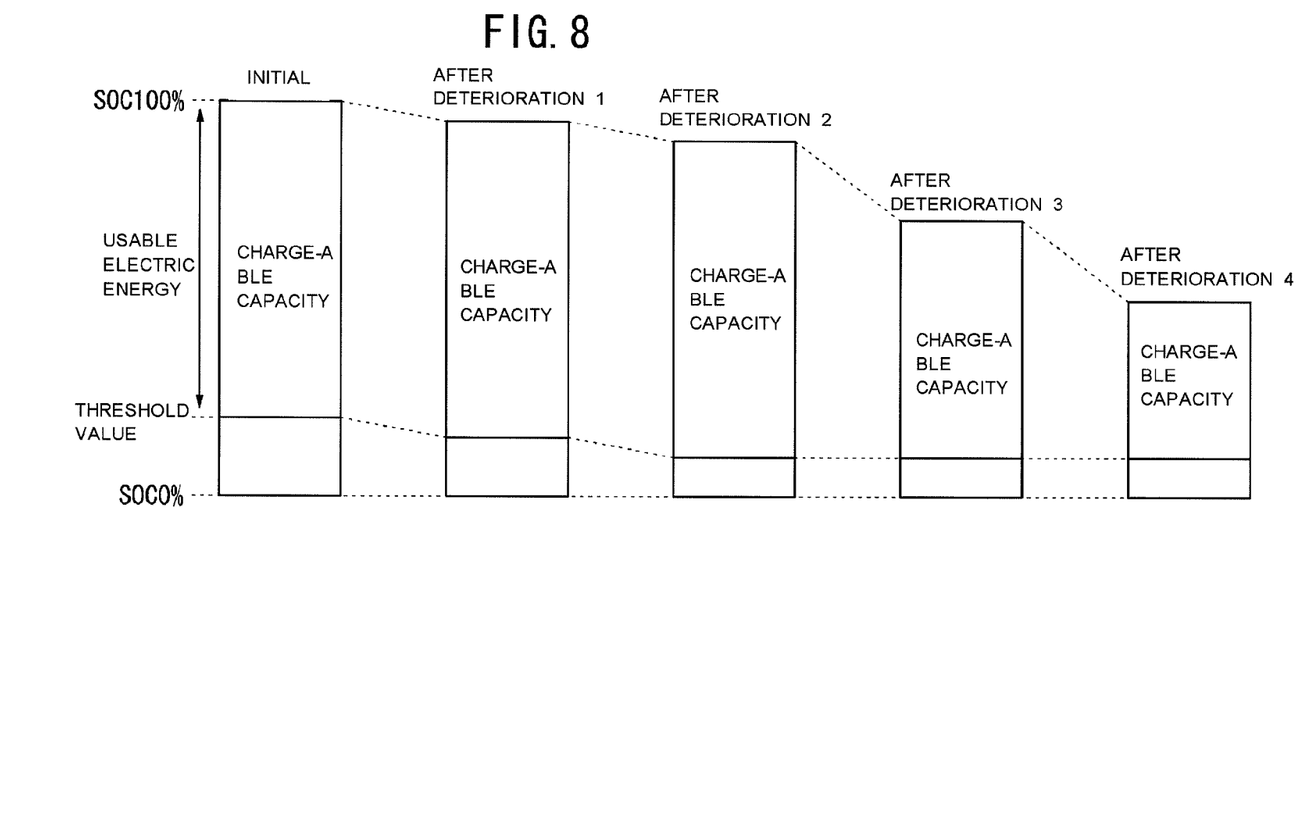
FIG. 8 is a view illustrating a chargeable capacity of the main battery.

On the other hand, in the service mode, the main battery 18 is discharged until the remaining capacity SOC of the main battery 18 becomes 0%. Therefore, the main battery 18 can be charged from the state in which the remaining capacity SOC of the main battery 18 is 0%. Since the electric energy charged until the remaining capacity SOC becomes 100% from 0% is the chargeable capacity of the main battery 18, the control unit 114 can determine the deterioration state and the chargeable capacity of the current main battery 18 by acquiring the charged electric energy. For example, as illustrated in FIG. 8, in case where the chargeable capacity of the initial main battery 18 is 10, for example, while the chargeable capacity of the main battery 18 after the deterioration 1 is 9.5, the chargeable capacity is reduced by 5% compared to the initial chargeable capacity, and hence, the main battery 18 deteriorates by the reduction. When the chargeable capacity of the main battery 18 after the deterioration 2 is 9, the chargeable capacity is reduced by 10% compared to the initial chargeable capacity, and hence, the main battery 18 deteriorates by the reduction.

When the chargeable capacity of the main battery 18 after the deterioration 3 is 7, the chargeable capacity is reduced by 30% compared to the initial chargeable capacity, and when the chargeable capacity of the main battery 18 after the deterioration 4 is 5, the chargeable capacity is reduced by 50% compared to the initial chargeable capacity. The main battery 18 deteriorates by the reduced capacity. As described above, the control unit 114 can obtain the deterioration state from the chargeable capacity of the initial main battery 18 stored in the storage unit and the chargeable capacity of the current main battery 18.

Even if the main battery 18 is fully charged when the remaining capacity SOC of the main battery 18 is not 0%, e.g., when the remaining capacity SOC is 40%, the chargeable capacity of the main battery 18 cannot correctly be acquired. More specifically, when the main battery 18 is fully charged in the case where the remaining capacity SOC is 40%, the control unit 114 can acquire the charged electric energy, but cannot acquire the electric energy that has already been stored in the main battery 18, so that it cannot acquire the chargeable capacity. The reason is as follows. Since the chargeable capacity varies according to the deterioration of the main battery 18, the electric energy stored in the main battery 18 is different according to the deterioration state of the main battery 18, even though the remaining capacity SOC is 40%, for example. Accordingly, the main battery 18 is fully charged after the remaining capacity SOC of the main battery 18 becomes 0%, whereby the deterioration state and the chargeable capacity of the main battery 18 can be acquired.

The threshold value used in the normal mode may be varied according to the deterioration state of the main battery 18. The usable electric energy can be made fixed by varying the threshold value, even if the deterioration of the main battery 18 progresses. In the service mode, the threshold value is varied when the chargeable capacity of the current main battery 18 is determined.

FIG. 8 is a view illustrating one example of the threshold value according to the deterioration state of the main battery. As illustrated in FIG. 8, when the threshold value is set to be 20% (corresponding to the electric energy of the remaining capacity SOC (20%) of the initial main battery) for the initial main battery 18, the usable electric energy of the initial main battery 18 is obtained by an equation of (remaining capacity SOC (100%) of the main battery 18)−(threshold value (corresponding to the electric energy of the remaining capacity SOC (20%) of the initial main battery))=(remaining capacity SOC (80%) of the initial main battery 18).

When the main battery 18 is in the state after the deterioration 1 illustrated in FIG. 8, the threshold value is set to be the electric energy corresponding to the remaining capacity SOC (15%) of the initial main battery 18, whereby the usable electric energy after the deterioration 1 can be made equal to the usable electric energy of the initial main battery 18. More specifically, since the main battery 18 after the deterioration 1 has the chargeable capacity decreased by 5% from the initial main battery 18, the chargeable capacity of the main battery 18 after the deterioration 1 is the same as the remaining capacity SOC (95%) of the initial main battery 18. Accordingly, the usable electric energy after the deterioration 1 is obtained by the equation of (remaining capacity SOC (95%) of the initial main battery 18)−(threshold value (electric energy corresponding to the remaining capacity SOC (15%) of the initial main battery 18))=(remaining capacity SOC (80%) of the initial main battery 18), thereby being equal to the usable electric energy of the initial main battery 18.

When the main battery 18 is in the state after the deterioration 2 (in which the deterioration progresses more than in the deterioration 1) illustrated in FIG. 8, the threshold value is set to be the electric energy corresponding to the remaining capacity SOC (10%) of the initial main battery 18, whereby the usable electric energy after the deterioration 2 can be made equal to the usable electric energy of the initial main battery 18. More specifically, since the main battery 18 after the deterioration 2 has the chargeable capacity decreased by 10% from the initial main battery 18, the chargeable capacity of the main battery 18 after the deterioration 2 is the same as the remaining capacity SOC (90%) of the initial main battery 18. Accordingly, the usable electric energy after the deterioration 2 is obtained by the equation of (remaining capacity SOC (90%) of the initial main battery 18)−(threshold value (electric energy corresponding to the remaining capacity SOC (10%) of the initial main battery 18))=(remaining capacity SOC (80%) of the initial main battery 18), thereby being equal to the usable electric energy of the initial main battery 18.

As described above, the threshold value is decreased according to the deterioration of the main battery 18 even when the main battery 18 deteriorates because it is used, whereby the usable electric energy can be made substantially equal.

When the threshold value is decreased according to the deterioration of the main battery 18, the main battery 18 might be discharged (over-discharged) until the remaining capacity SOC of the main battery 18 becomes not more than 0% depending upon the deterioration state of the main battery 18. Accordingly, a lower limit of the threshold value may be set, and the threshold value may not be dropped lower than the lower limit value. In the present embodiment, the lower limit of the threshold value is set to be the electric energy corresponding to the remaining capacity (10%) of the initial main battery 18.

When the main battery 18 is after the deterioration 3 (in which the deterioration progresses more than in the deterioration 2) illustrated in FIG. 8, the threshold value is set to be the electric energy corresponding to the remaining capacity SOC (10%) of the initial main battery 18 that is the lower limit value. In this case, the chargeable capacity of the initial main battery 18 is reduced by 30% after the deterioration 3, so that the chargeable capacity of the main battery 18 after the deterioration 3 is the electric energy equal to the remaining capacity SOC (70%) of the initial main battery 18. Therefore, the usable electric energy after the deterioration 3 is obtained by the equation of (remaining capacity SOC (70%) of the initial main battery 18)−(threshold value (electric energy corresponding to the remaining capacity SOC (10%) of the initial main battery 18))=(remaining capacity SOC (60%) of the initial main battery 18), thereby being reduced by 25% than the usable electric energy of the initial main battery 18.

When the main battery 18 is after the deterioration 4 (in which the deterioration progresses more than in the deterioration 3) illustrated in FIG. 8, the threshold value is set to be the electric energy corresponding to the remaining capacity SOC (10%) of the initial main battery 18 that is the lower limit value. In this case, the chargeable capacity of the initial main battery 18 is reduced by 50% after the deterioration 4, so that the chargeable capacity of the main battery 18 after the deterioration 4 is the electric energy equal to the remaining capacity SOC (50%) of the initial main battery 18. Therefore, the usable electric energy after the deterioration 4 is obtained by the equation of (remaining capacity SOC (50%) of the initial main battery 18)−(threshold value (electric energy corresponding to the remaining capacity SOC (10%) of the initial main battery 18))=(remaining capacity SOC (40%) of the initial main battery 18), thereby being reduced by 50% than the usable electric energy of the initial main battery 18.

When the control unit 114 displays the remaining amount of the current main battery 18, it may specify the usable electric energy of the initial main battery 18 as 100%, and may display how much the electric energy obtained by subtracting the threshold value from the electric energy stored in the current main battery 18 is with respect to the 100% usable electric energy of the initial main battery.

Figure 9:
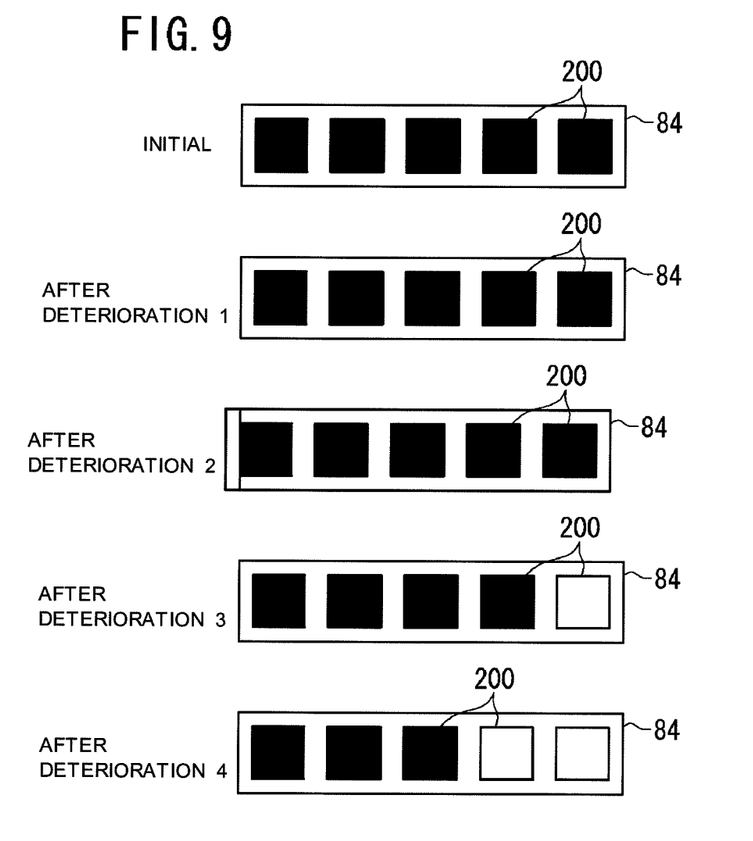
FIG. 9 is a view illustrating a display example of a remaining capacity of the main battery on a display unit, when the main battery is fully charged.

FIG. 9 is a view illustrating a display example of the remaining amount of the main battery on the display unit, when the main battery is fully charged. The display unit 84 has five light-emitting elements 200 arranged in a single horizontal row, wherein five light-emitting elements 200 function as a memory indicating the remaining amount of the battery. Since there are five light-emitting elements 200, each light-emitting element 200 indicates the electric energy corresponding to 20% of the usable electric energy of the initial main battery 18. When the initial main battery 18 is fully charged (when the remaining capacity SOC of the initial main battery 18 is 100%), the remaining amount of the battery is 100%, so that five light-emitting elements 200 are all illuminated.

When the main battery 18 after the deterioration 1 illustrated in FIG. 8 is fully charged (when the remaining capacity SOC of the main battery 18 after the deterioration 1 is 100%), the remaining amount of the main battery 18 after the deterioration 1 is equal to the usable electric energy of the initial main battery 18, so that all light-emitting elements 200 are lighted.

When the main battery 18 after the deterioration 2 illustrated in FIG. 8 is fully charged (when the remaining capacity SOC of the main battery 18 after the deterioration 2 is 100%), the remaining amount of the main battery 18 after the deterioration 2 is equal to the usable electric energy of the initial main battery 18, so that all light-emitting elements 200 are lighted.

When the main battery 18 after the deterioration 3 illustrated in FIG. 8 is fully charged (when the remaining capacity SOC of the main battery 18 after the deterioration 3 is 100%), the remaining amount of the main battery 18 after the deterioration 3 is the electric energy reduced from the usable electric energy of the initial main battery 18 by 25%. Therefore, the control unit 114 lights four light-emitting elements 200 from the leftmost light-emitting element 200, and does not illuminate the rightmost light-emitting element 200, in order to display the remaining amount of the main battery 18 after the deterioration 3. More specifically, the light-emitting element 200 corresponding to the reduced electric energy of 25% is not illuminated. With this, the user can recognize how much electric energy, which can currently be used, is stored in the main battery 18.

When the main battery 18 after the deterioration 4 illustrated in FIG. 8 is fully charged (when the remaining capacity SOC of the main battery 18 after the deterioration 4 is 100%), the remaining amount of the main battery 18 after the deterioration 4 is the electric energy reduced from the usable electric energy of the initial main battery 18 by 50%. Therefore, the control unit 114 illuminates three light-emitting elements 200 from the leftmost light-emitting element 200, and does not illuminate the rightmost light-emitting element 200 and the second light-emitting element 200 from the right, in order to display the remaining amount of the main battery 18 after the deterioration 4. More specifically, the light-emitting elements 200 corresponding to the reduced electric energy of 50% are not illuminated. In this case, when the flickering of the light-emitting element 200 indicates the electric energy corresponding to the usable electric energy of 10% of the initial main battery 18, the third light-emitting element 200 from the left is flickered to display the remaining amount of the main battery 18 after the deterioration 4. With this, the user can recognize how much electric energy, which can currently be used, is stored in the main battery 18.

When the main battery 18 is fully charged, and then, the electric motorcycle 10 is driven, by which the remaining capacity SOC of the main battery 18 is reduced, the control unit 114 lights the light-emitting element 200 according to the reduction.

As described above, the usable electric energy of the initial main battery 18 is defined as 100%, and the electric energy obtained by subtracting the threshold value from the electric energy stored in the main battery 18 is displayed, whereby the remaining amount of the current main battery 18 can easily be found.

The present invention has been described above with reference to the preferred embodiment, but the technical scope of the present invention is not limited to the scope described in the above-mentioned embodiment. It is apparent for a person skilled in the art that various modifications and improvements can be made to the above-mentioned embodiment. It is apparent from the description of the claims that the embodiment to which the various modifications and improvements are added is included in the technical scope of the present invention.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A discharge control apparatus in an electric vehicle comprising:
   a battery;
   a motor driven based upon electric power supplied from the battery;
   a discharge load that is a load other than the motor and that consumes electric power from the battery;
   battery capacity determining means for determining a remaining capacity of the battery; and
   control means for performing a discharge control of the battery for supplying electric power to the motor and the discharge load;
   wherein the control means allows the discharge of the battery until the remaining capacity becomes a threshold value higher than zero in a normal mode, and
   when the control means receives an instruction of checking a deterioration state of the battery from an external checking device, the control means changes from a normal mode to a service mode in which the control means allows the discharge of the battery until the remaining capacity becomes zero, and then, fully charges the battery so as to determine a chargeable capacity.

2. The discharge control apparatus in an electric vehicle according to claim 1, wherein the discharge load is a lighting device represented by at lease one of a taillight and a headlight.

3. The discharge control apparatus in an electric vehicle according to claim 1, wherein the control means supplies electric power to the motor so as to prevent the motor from rotating, when allowing the battery to be discharged until the remaining capacity becomes zero.

4. The discharge control apparatus in an electric vehicle according to claim 2, wherein the control means supplies electric power to the motor so as to prevent the motor from rotating, when allowing the battery to be discharged until the remaining capacity becomes zero.

5. The discharge control apparatus in an electric vehicle according to claim 1, wherein the control means includes a control program for executing the normal mode and a control program for executing the service mode, wherein the control means changes the control program to be executed according to the instruction from the checking device for checking the deterioration state.

6. The discharge control apparatus in an electric vehicle according to claim 2, wherein the control means includes a control program for executing the normal mode and a control program for executing the service mode, wherein the control means changes the control program to be executed according to the instruction from the checking device for checking the deterioration state.

7. The discharge control apparatus in an electric vehicle according to claim 3, wherein the control means includes a control program for executing the normal mode and a control program for executing the service mode, wherein the control means changes the control program to be executed according to the instruction from the checking device for checking the deterioration state.

8. The discharge control apparatus in an electric vehicle according to claim 1, wherein the remaining capacity, a cell voltage, and a cell temperature are displayed on the checking device.

9. The discharge control apparatus in an electric vehicle according to claim 2, wherein the remaining capacity, a cell voltage, and a cell temperature are displayed on the checking device.

10. The discharge control apparatus in an electric vehicle according to claim 3, wherein the remaining capacity, a cell voltage, and a cell temperature are displayed on the checking device.

11. The discharge control apparatus in an electric vehicle according to claim 5, wherein the remaining capacity, a cell voltage, and a cell temperature are displayed on the checking device.

12. A discharge control apparatus for use in an electric vehicle comprising:
an electric motor;
a discharge load that is a load other than the motor for consuming electric power;
battery capacity determining means for determining a remaining capacity of a battery; and
control means for performing a discharge control of a battery for supplying electric power to the motor and the discharge load;
wherein the control means allows a discharge of the battery until the remaining capacity becomes a threshold value higher than zero in a normal mode, and
an external checking device operatively connected to the control means for providing instructions of checking a deterioration state of the battery, wherein said control means is changed from a normal mode to a service mode in which the control menas allows the discharge of the battery until the remaining capacity becomes zero, and then, fully charges the battery so as to determine a chargeable capacity.

13. The discharge control apparatus for use in an electric vehicle according to claim 12, wherein the discharge load is a lighting device represented by at lease one of a taillight and a headlight.

14. The discharge control apparatus for use in an electric vehicle according to claim 12, wherein the control means supplies electric power to the motor so as to prevent the motor from rotating, when allowing the battery to be discharged until the remaining capacity becomes zero.

15. The discharge control apparatus for use in an electric vehicle according to claim 13, wherein the control means supplies electric power to the motor so as to prevent the motor from rotating, when allowing the battery to be discharged until the remaining capacity becomes zero.

16. The discharge control apparatus for use in an electric vehicle according to claim 12, wherein the control means includes a control program for executing the normal mode and a control program for executing the service mode, wherein the control means changes the control program to be executed according to the instruction from the checking device for checking the deterioration state.

17. The discharge control apparatus for use in an electric vehicle according to claim 13, wherein the control means includes a control program for executing the normal mode and a control program for executing the service mode, wherein the control means changes the control program to be executed according to the instruction from the checking device for checking the deterioration state.

18. The discharge control apparatus for use in an electric vehicle according to claim 14, wherein the control means includes a control program for executing the normal mode and a control program for executing the service mode, wherein the control means changes the control program to be executed according to the instruction from the checking device for checking the deterioration state.

19. The discharge control apparatus for use in an electric vehicle according to claim 12, wherein the remaining capacity, a cell voltage, and a cell temperature are displayed on the checking device.

20. The discharge control apparatus for use in an electric vehicle according to claim 13, wherein the remaining capacity, a cell voltage, and a cell temperature are displayed on the checking device.

* * * * *